Jan. 10, 1939. J. C. DANIELSON 2,143,057
MOWER
Filed Oct. 22, 1937
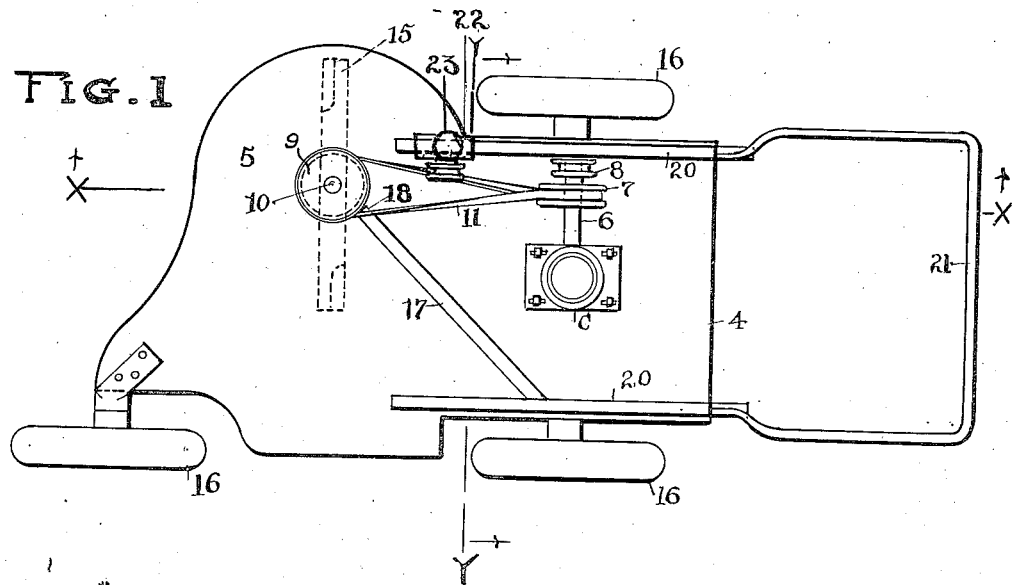
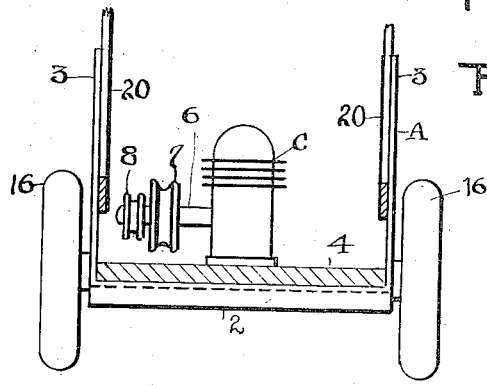
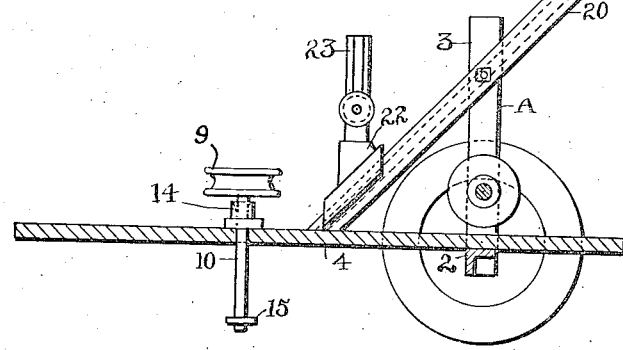
INVENTOR
JOHN C. DANIELSON
BY Edward M. Fisher
ATTY.

Patented Jan. 10, 1939

2,143,057

UNITED STATES PATENT OFFICE 2,143,057

MOWER

John C. Danielson, St. Petersburg, Fla.

Application October 22, 1937, Serial No. 170,320

2 Claims. (Cl. 56—25)

My invention relates to improvements in mowers.

An object of my invention is to provide a machine which is structurally inexpensive and which is especially adaptable for lawn mowing.

A further object of my machine is to provide a mower whereby the operator can cut close to shrubbery and trees and the like without damaging same, a guard member being provided.

I attain these objects by mechanism illustrated in the accompanying drawing, wherein:

Fig. 1 is a plan view of the complete machine with hedge cutting mechanism removed.

Fig. 2 is a vertical section on the line X—X Fig. 1, with the power belt and hedge cutter removed.

Fig. 3 is a vertical section on the line Y—Y Fig. 1.

Similar reference characters refer to similar parts throughout the several views.

In the preferable structure of my machine I provide an angular frame A having a horizontal member 2 and uprights 3 at opposite ends of member 2. Upon member 2 and horizontal therewith, is mounted and secured thereto a power bed 4, said bed at one side of the forepart 5 being semi-circular from a radius point common with the center of a vertical rotatable shaft 10 and upon the lower portion of which is a suitably mounted cutting blade 15, as will be hereinafter described, however the radius of the curved portion 5 is slightly greater than the radius of the cutting member thereby providing a guard to prevent cutting of or damage to shrubbery, trees and the like.

Located to the rear of said power bed 4 and adjustable therewith in a manner which provides means for tightening and for loosening of the power belt 11, is a prime mover C having a drive shaft 6 upon which are mounted pulleys 7 and 8. At mid-forepart of said power bed 4 and to one side of the center of said bed is a pulley wheel 9 mounted in horizontal position on the upper end of the vertical rotatable shaft 10 and adapted to rotate said shaft when coupled by suitable means such as a belt 11 with the pulley wheel 7.

Said shaft 10 extends downward from pulley 9 through an opening in the power bed 4 and is supported by a tapering roller bearing 14 which is secured to the power bed 4. Attached at the lower end of said shaft 10 and rotatable therewith is a horizontal cutting member 15, having extended arms upon which are mounted the cutting blades 15.

To provide traction for my machine three bearing mounted wheels 16 are provided, two of which are at the rear sides and one at the front on the side opposite that of the curved portion 5, thereby providing an unobstructed forward path for said mower and permitting mowing close to trees, hedges and the like. To provide support which would otherwise be supplied by the fourth wheel, a brace 17 is used, one end of which is secured to the fore-part of the power bed approximately halfway between the center thereof and the outer curved portion 5, the opposite end of the brace 17 being bolted or otherwise secured at 18 to an angular side frame support 20, of which there are two at opposite sides of the machine. The foot of each of said angular side frame supports 20 is secured to an upright 3, the upper portion of said members 20 acting as a continuation and supporting means for a handle 21 which is fastened thereto by bolts or other means.

What I claim:

1. A mower, of the character described, a machine, having, in combination a frame having a horizontal base with upright portions at opposite ends, a power bed secured to said base portion, angular side braces extending from the fore-part of said power bed to the upright portions of said frame, a portion of the fore-part and one side of the power bed being semi-circular from a radius point common with the center of a vertical rotatable cutter driving member which has suitable bearings and which extends through said bed and has rotatable therewith at the bottom thereof a cutting member which is rotatable parallel with the ground, the radius of said semi-curved portion being sufficiently greater than the radius of the cutting member to permit close mowing to shrubbery without damaging same, tripodal arranged wheels having suitable bearing connections with said machine, two of said wheels being at opposite sides and to the rear and a third wheel at one fore side and opposite the semi-curved portion thereby assuring an unobstructed forward path for the mower and permitting mowing close to trees, hedges, and the like, a brace member extending from the semi-curved portion to an upright portion of a frame member on the opposite side of the machine to retain the fore-part of the mower in a horizontal position, a prime mover adjustably secured to the rear portion of the power bed and actuating means connecting said prime mover with said cutter driving member, and a handle attached to the frame of said machine.

2. A mower, of the character described, having, in combination, a frame with a horizontal base and right angle uprights at opposite ends, a power bed mounted thereon and extending forward therefrom, a vertical rotatable cutter driving member extending through the fore-part of said bed and associated therewith by bearing means, a cutting member attached to the lower end of said member and adapted to rotate parallel to the ground, a prime mover mounted upon said power bed, actuating means connecting said prime mover and cutter driving member, tripodal arranged bearing mounted wheels on said machine, whereby wheel interference with a forward mowing operation is prevented, a brace member providing horizontal supporting means for the fore-part on said machine, which brace member is connected to said right angle uprights and a handle attached to said machine.

JOHN C. DANIELSON.